United States Patent [19]

Greanias et al.

[11] Patent Number: 5,386,219
[45] Date of Patent: Jan. 31, 1995

[54] TOUCH OVERLAY FOR IMPROVED TOUCH SENSITIVITY

[75] Inventors: Evon C. Greanias, Chevy Chase, Md.; Guy F. Verrier, Reston, Va.; Robert L. Donaldson, Annapolis, Md.

[73] Assignee: International Business Machines Corp., Armonk, N.Y.

[21] Appl. No.: 97,582

[22] Filed: Jul. 28, 1993

Related U.S. Application Data

[63] Continuation of Ser. No. 778,431, Oct. 16, 1991, abandoned.

[51] Int. Cl.$^6$ ............................................. G09G 5/00
[52] U.S. Cl. .................................... 345/174; 345/179
[58] Field of Search ............... 340/706, 709, 711, 712, 340/825.79, 825.81; 178/18, 19; 341/23, 26, 33; 345/179, 182, 183, 104, 173, 174, 175, 176

[56] References Cited

U.S. PATENT DOCUMENTS

| | | | |
|---|---|---|---|
| 4,186,392 | 1/1980 | Holz | 344/26 X |
| 4,263,582 | 4/1981 | Dumbovic | 341/26 |
| 4,550,384 | 10/1985 | Kimura | 178/18 X |
| 5,007,085 | 4/1991 | Greanias et al. | 340/706 X |
| 5,117,071 | 5/1992 | Greanias et al. | 340/706 X |
| 5,149,919 | 9/1992 | Greanias et al. | 178/19 |

FOREIGN PATENT DOCUMENTS

| | | | |
|---|---|---|---|
| 0033290 | 3/1980 | Japan | 178/18 |
| 0117028 | 7/1983 | Japan | 178/18 |

Primary Examiner—Jeffery Brier
Attorney, Agent, or Firm—Martin J. McKinley

[57] ABSTRACT

An improved touch overlay for the viewing surface of a display for detecting both finger touch and stylus location is disclosed. An upper and a lower set of transparent conductors are disposed on at least one transparent flexible insulating substrate and are oriented orthogonally with respect to each other. Depending on the orientation of the transparent conductors, top and bottom cover layers may be added to the overlay. The separation between the upper and lower conductors and a separation from the user's finger on the top surface of the overlay from the upper conductors is optimized. To speed finger touch sensing, the ambient capacitance of the overlay is reduced by increasing the separation between the upper and lower conductors layers. For improved operation, the present invention features a separation of at least 3 mils between upper and lower conductors. The separation between the top surface and the upper conductors is held to a minimum consistent with the preservation of integrity of the upper conductors when stylus pressure is applied. Means are also included in the overlay to improve the durability of the overlay with respect to repeated stylus pressure on top surface.

28 Claims, 6 Drawing Sheets

TOUCH OVERLAY FOR IMPROVED TOUCH SENSITIVITY

This application is a continuation of application Ser. No. 07/778,431 filed Oct. 16, 1991, now abandoned.

FIELD OF THE INVENTION

This invention relates generally to input devices for a data processing system. More particularly, it relates to an improved touch overlay for use with an interactive input device disposed on a computer display which permits either finger touch input or stylus input.

BACKGROUND OF THE INVENTION

The use of a touch input device disposed over the viewing surface of a computer display to provide a "user friendly" means for the control of a data processing system is well known in the art. These devices are designed to allow an unsophisticated user to perform desired tasks on a computer system without extensive training. Human factor studies have shown that an input device which allows the user to input data directly on the computer display generally known in the art as a touch input device, achieves greatest immediacy and accuracy between man and machine.

One of the first input devices for use at the display surface was the light pen. The light pen is an optical detector in a hand held stylus, which is placed against the face of the cathode ray tube in the computer display. The light pen detects the dot of light which is the scanning raster of the CRT. By determining the coordinates of the raster as it is sensed by the light pen, the computer system locates the light pen on the display.

One touch input device uses a frame which fits around the display screen having a number of infrared or visible light transmitters and receptors arranged in parallel horizontal and vertical directions. When the user's finger blocks the light beams, the horizontal and vertical receptors note the absence of the signals, thereby locating the position of the action desired by the user.

Another class of known touch input devices use transparent overlays placed over the display screen. These touch overlays use a variety of means of detecting the presence and location of either a stylus or finger on or near the display surface. One overlay type is a mechanical deformation membrane, a transparent overlay which consists of two transparent conductor planes disposed on a flexible surface. When a selection is made, the user mechanically displaces one of the conductor planes to touch the other by a finger or stylus touch, thereby bringing the conductors into electrical contact. Appropriate electronics and software translate the electrical signals generated by the finger or stylus touch to the position on the display surface. Other touch overlays use capacitive or resistive means in the transparent overlay and associated electronics, to detect the input of a user by finger touch. This type of input device can detect the location of a finger touch by the change in capacitance or impedance of the overlay. Yet other touch overlays use a stylus for user input, either to change the capacitance or impedance at the touched location on the touch screen or to return the electromagnetic or electrostatic signals generated by the overlay back to a microprocessor to determine the stylus position.

Most of the prior art touch devices described above accept input either from a stylus or by a finger touch, but not both. If they can sense the presence of either a finger or a stylus, they generally do not distinguish between the two. In the current graphical user interfaces developed to aid man-machine interaction, there are many items, such as menu selections, icons or windows, which a user can most easily select by a finger. In other advanced software applications which perform freehand drawing, gesture recognition or handwriting capture, a stylus is more effective because of its greater precision. Thus, it would be convenient to utilize a touch input system which allows both stylus and finger touch detection.

One such system is described in U.S. Pat. No. 4,686,332, to E. Greanias, et al., entitled "Combined Finger Touch And Stylus Detection System For Use On The Viewing Surface Of A Visual Display Device" filed Jun. 26, 1986, which is hereby incorporated by reference. This touch input system allows for both finger touch and stylus detection. The system includes a touch overlay sensor which comprises an array of horizontal and vertical transparent conductors arranged on the viewing surface of the visual display device. The conductor array emits electromagnetic or electrostatic signals at 40 kHz into the region above the display surface under the control of a microprocessor. A stylus "antenna" is connected to an input of the detector control system and senses the signals emitted by the array. The signal amplitude sensed by the stylus is related to the position of the stylus on and above the display and the particular conductors being energized. Radiative signal measuring means coupled to the stylus measures the electromagnetic or electrostatic signal received by the stylus.

The finger touch sensing system in U.S. Pat. No. 4,686,332 is a capacitance measurement means which measures the capacitance of selected conductors and determines where and when a finger touch occurs. The system also includes a means for either connecting the output of radiation source or the capacitance measurement means to selected patterns of horizontal and vertical conductors in the array for stylus or finger touch sensing respectively.

The touch overlay described in the U.S. Pat. No. 4,686,332 suffers from a number of disadvantages. A finger touch on the overlay is sensed by a small change in the capacitance of the individual conductors. The capacitance can be measured with a variable frequency oscillator which connects the individual conductors to the period controlling capacitor of the oscillator. When no finger is touching the overlay, the oscillator runs at a frequency determined by the ambient capacitance of the overlay cables and electronic circuit capacitance. By studying the touch input system and its applications, certain goals, such as minimizing the ambient overlay capacitance, and thereby maximizing the percent change in capacitance when the overlay is touched, can be appreciated. Lower ambient capacitance is desired for applications that require greater speed and accuracy in finger touch operation. With only 2 mils separation between horizontal and vertical conductors, the ambient capacitance to ground is not minimized because the conductor that is being sensed passes relatively close to all the conductors in the other layer which were grounded during that measurement.

Another problem with the overlay structure described in the '332 patent is that the transparent conductors in the overlay are susceptible to microcracks, particularly in applications with a high stylus use. The transparent conductors described in the '332 patent are preferably comprised of indium tin oxide (ITO) because of its transparent and conductive properties. However, as ITO is a ceramic material, it is relatively brittle. After repeated pressure by the tip of a stylus, microcracks can develop in the overlay conductors causing eventual failure of the touch overlay. This problem is aggravated by formation of the upper conductors on the lower surface of the upper substrate, i.e. oriented down, toward the display surface in the same manner as those in a mechanical deformation membrane. When an ITO conductor faces toward the display, it is subject to predominantly tensile forces and is stretched at the point of contact of the stylus on the overlay surface. ITO is very susceptible to cracking problems when subjected to tensile forces. On the other hand, ITO is known to be relatively immune to compression forces. If the upper conductors could be oriented upwards away from the display, they would be subject to compressive forces, and therefore, less likely to crack.

SUMMARY OF THE INVENTION

It is an object of this invention to increase the speed at which the presence of a finger can be detected in a transparent overlay disposed over a viewing surface which is also capable of determining the position of a radiative pickup stylus.

It is another object of this invention to maintain or improve the accuracy of determining the position of a finger on the transparent overlay at a higher speed which is also capable of sensing the radiative pickup stylus.

It is a further object of this invention to provide a transparent overlay of sufficient durability, particularly with applications having repeated stylus pressure on the overlay.

These objects and others are accomplished in a finger touch and stylus sensing system using a touch overlay which is a laminate structure having at least one substrate composed of a transparent, flexible, insulating material on which a parallel arrangement of horizontal or vertical transparent conductors is disposed. In the overlay, there are two sets of transparent conductors which are oriented orthogonally with respect to each other. The conductors are deposited on the upper or lower surface of a substrate layer and are said to face up or down respectively. Depending on the orientation of the transparent conductors, top and bottom cover layers may be added.

The invention relies on selecting thicknesses of the substrates and top cover to optimize the separation of the horizontal and vertical conductors from each other and the conductors' separation from the user's finger on the top surface of the overlay for finger touch determination. In the preferred embodiment, capacitance is measured with a variable frequency oscillator which connects individual ITO conductors to the period controlling capacitor of the oscillator. When no finger touches the overlay, the oscillator runs at a frequency determined by the ambient capacitance between the conductors, in the overlay cables, and in the electronic circuitry. The frequency of the variable frequency oscillator circuit is inversely proportional to the ambient capacitance. To deal with electrical noise, an adequate number of cycles of the oscillator circuit must be run before the measured capacitance value is reliable. Therefore, to speed the finger touch sensing, the ambient capacitance must be reduced, thereby making the time to run the required cycles shorter. The ambient capacitance between the two layers of transparent conductors can be reduced by increasing the distance between the upper and lower conductor layers. For improved operation, the present invention features a separation of at least 3 mils between the upper and lower conductors.

The magnitude of capacitance change between ambient and finger touch conditions must also be sufficient for reliable finger touch operation. The smaller the separation between finger and conductor, the larger the capacitance change. It is relatively easy to keep the layers between the upper conductors and the finger thin to improve the sensing of the finger by these conductors. However, increasing the separation between the upper and lower conductors to improve the ambient capacitance also increases the distance from a finger on the overlay surface to the lower conductors. This reduces the capacitance change due to finger touch as sensed by the lower conductors. However, as long as the thicknesses in the overlay are chosen such that the percent reduction in the capacitance change due to finger touch for the lower conductors is less than the percent reduction in ambient capacitance due to the separation of conductor layers, the speed advantage of the lower ambient capacitance will be realized. Other improvements to the variable frequency oscillator circuit to lower ambient capacitance are also contemplated by the invention.

The transparent conductors may be either disposed on the top surface of a substrate, oriented up and away from the display surface toward the user's finger or on the bottom surface of substrate, oriented down and toward the display surface. According to the invention, four general overlay structures are possible.

The second improvement taught by the present invention is improved durability of the overlay structures designed to have low ambient capacitance for higher finger touch operating speed. The basic way to protect the fragile ITO transparent conductor material from cracking is to restrict the elongation which the ITO can experience when a stylus device presses against the overlay surface. One way to restrict elongation of the ITO film is to support it on a hard surface, for example, the glass of the viewing surface of the display, which will not be distorted by the stylus pressure. The force of the stylus will distort softer material above the hard glass surface and the tip of the stylus if it is softer than the glass. By restricting the thickness of any soft material film placed between the ITO and the hard surface, the distortion of material beneath the ITO layer and the maximum elongation of the ITO layer itself, are limited to acceptable values. Providing a hard material like glass immediately beneath the lower layer conductors is a useful way to limit their elongation. If any soft protective cover is used between the lower layer conductors and the hard material, the thickness of the cover should be very thin, well within the allowable elongation limits of the ITO film. Face-up orientation is a particularly useful method to constrain the elongation of the upper layer conductors. The layers immediately beneath the upper layer can not be made as hard as the glass of the display very easily. The upper layer conductors will be distorted by stylus pressure, but with the face-up configuration, the ITO will not experience tension.

Other factors like the hardness of the stylus, and the hardness of the overlay substrate and bonding materials will also affect the magnitude of the forces that reach the ITO film layers. For typical overlay material choices, face-up orientation for either conductor layer and a hard glass surface near the bottom conductor layer restrict elongation of the ITO adequately.

BRIEF DESCRIPTION OF THE DRAWINGS

These objects, features and improvements will be better understood with reference to the following figures.

DETAILED DESCRIPTION OF THE INVENTION

Figure 1:
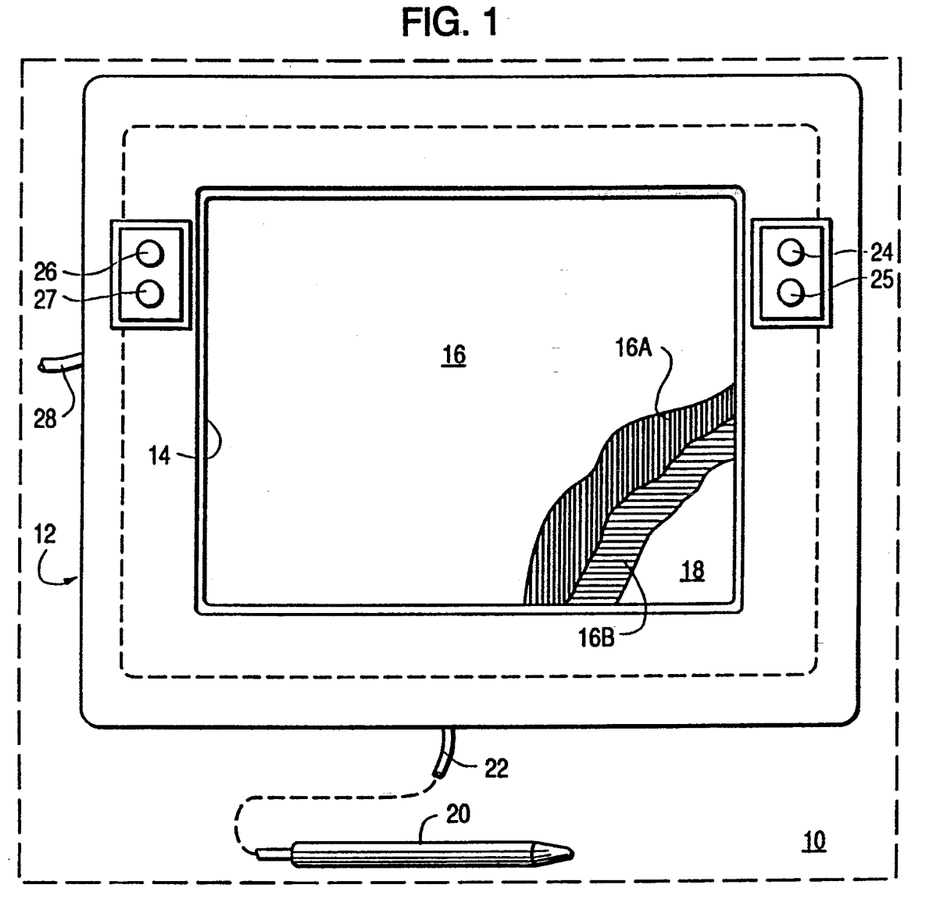
FIG. 1 shows the front view of the overlay used for the detection of finger touch and stylus position disposed over a flat panel display, the entire assembly being called a touch workpad.

Referring to FIG. 1, a touch workpad, substantially similar to that described in copending application, Ser. No. 351,227 to Arbeitman et al., entitled "Flat Touch Screen Workpad For A Data Processing System", filed May 15, 1989, which is hereby incorporated by reference, is shown. The workpad 10 comprises a housing 12 having a rectangular recessed window 14 which surrounds the edges of a rectangular touch overlay 16. The overlay 16 is transparent and is disposed on a liquid crystal display (LCD) 18. The overlay 16 consists of a laminate structure including several plastic substrate layers laminated together by means of adhesive layers. The overlay 16 also includes a first plurality of transparent conductors 16A disposed in the vertical direction and a second plurality of transparent conductors 16B disposed in the horizontal direction. Several of the conductors in both vertical and horizontal directions are positioned beyond the recessed window 14 to allow more accurate location determination of the stylus 20 or a finger on or near the overlay 16 at the edges of the display window 14.

A stylus 20 is connected by cable 22 to the touch workpad. The stylus 20 acts as an antenna to pick up the signals radiated by the overlay 16, and provides a much greater resolution than can be provided by a finger touch. Also on the bezel of the housing are four button switches 24-27 which can be used to change the mode in which the data from the workpad 10 is received. Workpad cable 28 is the connector between the workpad 10 and the computer with which the user is communicating. The workpad cable 28 provides power to the workpad 10 as well as display signals to operate the LCD 18 and touch signals to operate the overlay in both finger touch and stylus modes. In addition, the cable 28 is also the conduit to the computer of the measurement of the signal strength received by the stylus 20 and the frequency change due to changes in capacitance due to a finger touch.

Figure 2A:
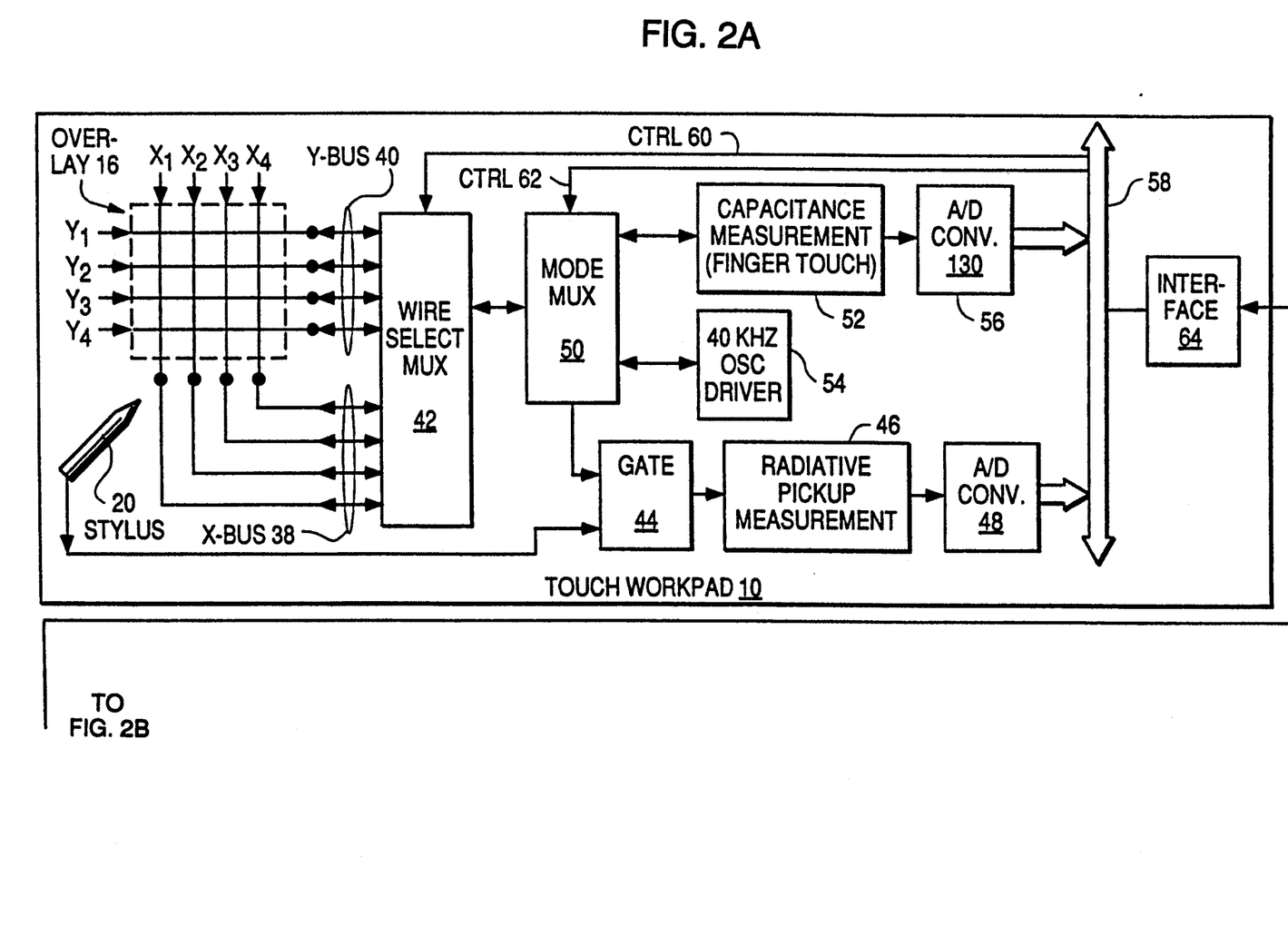
FIG. 2 is an architectural diagram of the combined finger touch and stylus detection system.
Figure 2B:
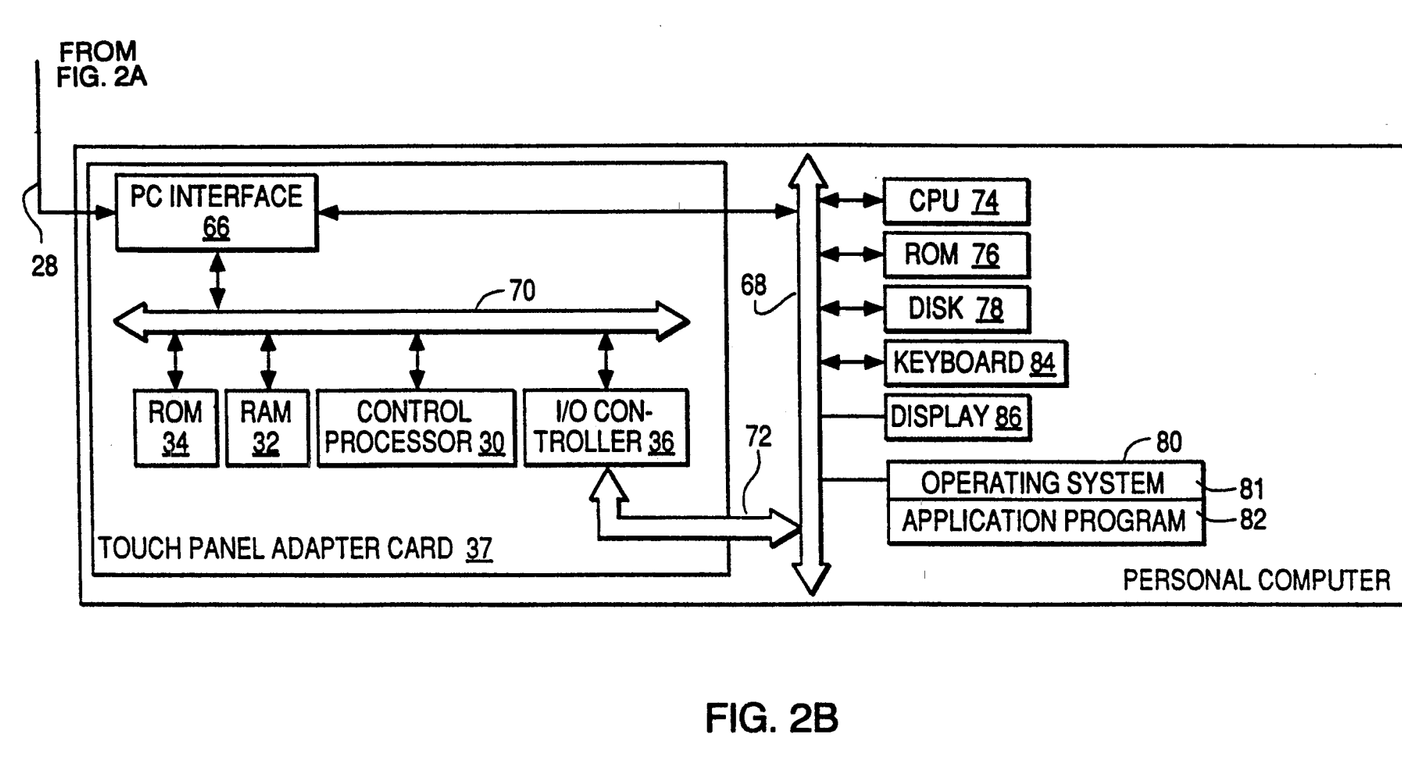

FIG. 2 shows an architectural diagram of the finger touch and stylus detection system. The system depicted in FIG. 2 is very similar to that disclosed in the U.S. Pat. No. 4,686,332 in FIG. 9. Major differences include: the overlay 16 is constructed according to the principles of the present invention, and the stylus 20 is of the improved design disclosed in copending application "Improved Stylus Sensing System" Ser. No. 07/608,062 to Greanias, et al., filed Oct. 15, 1990, and hereby incorporated by reference. Also, the touch control processor 30, random access memory 32, read only memory and the I/O controller 36 are on a touch panel adapter card 37 in a personal computer while the rest of the touch electronics are integrated in the touch workpad 10. Those skilled in the art would understand that the touch electronics could alternatively be included in the workpad 10, if it was deemed undesirable to devote a slot in the personal computer to an adapter card.

As discussed in connection with FIG. 1, the touch workpad 10 communicates with the personal computer and touch panel adapter card 37 via cable 28. The vertical X conductors are connected through the X bus 38 and the horizontal Y conductors are connected through the Y bus 40 to the wire selection multiplexer 42, respectively. The radiative pickup stylus 20 is connected through the gate 44 to the radiative pickup measurement device 46. The wire selection multiplexer 42 is connected through the mode multiplexer 50 to the capacitance measurement device 52 which is used for capacitance finger touch detection. The wire selection multiplexer 42 is also connected through the mode multiplexer 50 to the 40 kilohertz oscillator driver 54 which is used to drive the X bus 38 and the Y bus 40 for the stylus detection operation. The mode multiplexer 50 also has an enabling output to the gate 44 to selectively connect the output of the stylus 20 to the radiative pickup measurement device 46, for stylus detection operations. The output of the capacitance measurement device 52 is connected through the analog-to-digital converter 56 to the workpad bus 58. The output of the radiative pickup measurement device 46 is connected through the analog-to-digital converter 48 to the bus 58. A control input 60 to the wire selection multiplexer 42 is connected to the bus 58. The control input 62 is connected to the mode multiplexer 50 from the bus 58.

The workpad bus 58 is connected via workpad interface 64 to the cable 28 which connects to PC interface 66 in the touch panel adapter card 37 in the personal computer. The PC interface 66 communicates to the main system bus 68 and to the adapter card bus 70. The I/O controller 36 has an I/O bus 72 which connects to the main bus 68 of the personal computer. The I/O controller 36 is also connected to adapter card bus 70. The adapter bus 70 also interconnects the control processor 30 with the read only memory (ROM) 34, and the random access memory (RAM) 32. The personal computer includes standard devices such as a CPU 74, ROM 76, disk storage 78, a memory 80 which stores operating system 81 and application program 82, a standard keyboard 84 and standard display 86. The standard display 86 is typically a CRT, and in the preferred embodiment is in addition to the LCD 18 in the workpad 10.

The wire selection multiplexer 42 and the mode multiplexer 50 connect selected patterns of a plurality of the horizontal and vertical conductors in the overlay 16 to either the capacitance measurement device 52 or the 40 kilohertz oscillator driver 54, in response to control signals applied over the control inputs 60 and 62 from the bus 58 by the control processor 30. During finger touch operations, the capacitance measuring device 52 has its input coupled through the mode multiplexer 50 and the wire selection multiplexer 42 to selected single conductors in the horizontal and vertical conductor array in the overlay 16 in response to control signals from the control processor 30. The output of the capacitance measurement device 52 is converted to digital values by the A/D converter 56 and is supplied over the bus 58 to the control processor 30. The control processor 30 executes a sequence of stored program instructions to detect the horizontal array conductor pair and the vertical array conductor pair in the overlay 16 which are being touched by the operator's finger. Although other means of detecting changes in capacitance are known in the art, and would be within the scope of the U.S. Pat. No. 4,686,332, the variable frequency oscillator circuit mentioned above is preferred in the present invention.

In the stylus detection mode, the 40 kilohertz output of the oscillator driver 54 is connected through the mode multiplexer 50 and the wire selection multiplexer 42 to selected conductors in the overlay 16, in response to control signals applied over the control inputs 60 and 62 from the control processor 30. The 40 Khz radiation signals received from the overlay 16 by the stylus 20 are passed through the gate 44 to the radiative pickup measurement device 46, which measures those signals and provides an output which is digitized by the converter 48 and output to the control processor 30. The control processor 30 executes a sequence of stored program instructions to detect the proximity of the stylus to the overlay 16.

As mentioned previously, certain applications such as selecting items from a list, finger sensing methods have been found more convenient. Where greater precision is required, such as applications with a high information density, or where freehand drawing or handwriting is recognized, the use of a stylus has been found more effective. Thus, the ability of the detection systems disclosed in the U.S. Pat. No. 4,686,332 and the copending application Ser. No. 608,062 to detect both finger and stylus is quite useful.

The finger touch and stylus sensing modes operate independently of one another, the detection system cycling between the two modes until a finger touch or stylus is detected. The stylus sensing mode, which is the subject of the application Ser. No. 608,062, is more forgiving. It is relatively easy to pick up the radiated 40 Khz signal no matter what the thicknesses of the overlay layer may be. For stylus, it would be best to have relatively thick cover layers on the order of 0.25 inches, as the further the stylus is from the conductors, the more uniform the signal intensity across the overlay will be. The additional thickness of the cover layers also helps protect the brittle, transparent conductors from stylus pressure.

However, for finger touch sensing, it is necessary to control the thickness of cover layers and substrates more carefully to optimize the percent capacitance changes during finger touch. Depending on the desired operating speed and noise environment, the separation between conductor layers might range from 0.003 inches to 0.010 inches. The thickness between the top surface of the overlay and the upper conductors is preferably no more than 3 mils, and more preferably as thin as possible. Much of the copending application Ser. No. 07/608,062 is concerned with compensating variations in stylus signal amplitude that occur with such thin overlays. Improvements in stylus sensing are not the subject of the present invention; further details can be found in the above referenced application Ser. No. 07/608,062.

In the preferred embodiment, capacitance is measured with a variable frequency oscillator circuit which connects the individual ITO conductors to the period controlling capacitor of the oscillator. When no finger is touching the overlay, the oscillator runs at a frequency determined by the ambient capacitance of the overlay, cables and electronic circuit capacitance. Because the touch overlay is in an environment with electrical noise, a certain number of cycles of the oscillator circuit must be run before the measured capacitance value can be relied upon.

The ambient capacitance of the overlay is determined by measuring the time required for the oscillator to run through a prescribed number of cycles. This interval is measured by counting cycles of a high frequency (10 MHZ) clock while the prescribed cycles are run. During the time there is no finger touch, "baseline" count ambients are established sequentially for each of the conductors. When a finger touch occurs, the capacitance of conductors near the finger increase and it takes longer for the oscillator to run through the prescribed number of cycles for those conductors. The longer periods result in more counts of the high frequency clock cycles for those conductors. When the number of counts exceeds the baseline value stored for that conductor by a sufficient margin, the conductor is deemed to be touched. The required number of oscillator cycles are prescribed to provide safety margins that cope with random variations due to noise and other factors. The difference in the number of counts for individual conductors provides the information to determine x and y positions for each finger touch.

The capacitance of an individual conductor is measured by connecting it to the circuit that controls the period of a sawtooth oscillator. Current from the oscillator power supply charges the capacitance during the rise of the sawtooth wave. When the charge reaches the trigger voltage of the oscillator, a transistor turns on and the capacitance is discharged, completing the sawtooth cycle. The duration of the rise period of the sawtooth wave is measured by counting pulses of a stable high frequency oscillator. The number of pulses during the sawtooth rise period serves as a practical measure of capacitance. More pulses are counted when a finger is present because the capacitance increases, the slope of the charging curve is decreased, and the duration of the rise period is extended. The increase in number of pulses counted when the finger is present, though relatively small, is made sufficient for reliable sensing by repeating the measurement cycle several times. The pulse counts accumulated over repeated measurement cycles are large enough to reduce the effect of random errors.

The main source of error for these measurements is occurrence of random noise at oscillator trigger time. To reduce likelihood of noise pulse occurrence near trigger time, the sawtooth passes through the trigger region as rapidly as possible. The rise period is kept shorter than the charging time constant of the sensor conductors to assure that the charge curve remains linear throughout the period. Experiments have shown that depending on the size of the overlay, noise environment, and other factors, 4 to 12 repetitions with a short rise period provide enough accumulated counts for reliable finger touch detection. Low overlay capacitance is a basic requirement for this type of finger touch sensing.

For reliable finger touch detection, the oscillator is run through a prescribed number of cycles. Finger touch contacts tend to have random variations which are overcome by observing multiple oscillator cycles to "average out" the variations. The duration of each cycle provides an indication of the oscillator period and capacitance. By repeating the measurement for a greater number of cycles and accumulating the results, the effects of random errors in timing when individual cycles begin or end is reduced. By reducing the ambient capacitance of the overlay structure, the prescribed number of cycles can occur in less time, and touch operation can be faster. If the capacitance is made small enough, it is possible to increase the number of cycles, thereby further reducing the effects of random errors, and still obtain an improvement in speed of operation.

The frequency of the variable frequency oscillator circuit is inversely proportional to the ambient capacitance. To improve the speed of finger touch sensing, it is necessary to reduce capacitance of circuit: the capacitance between the two layers of transparent conductors, the capacitance between bus drive lines and transparent conductors, and the capacitance of the cable that connects the electronics to the bus lines. The closely spaced layers of transparent conductors in the touch surface contribute the most capacitance. By increasing the separation between the upper and lower conductor layers, T2, the ambient capacitance can be reduced substantially. For improved operation, the present invention teaches a separation of at least 3 mils between upper and lower conductors.

Figure 3:
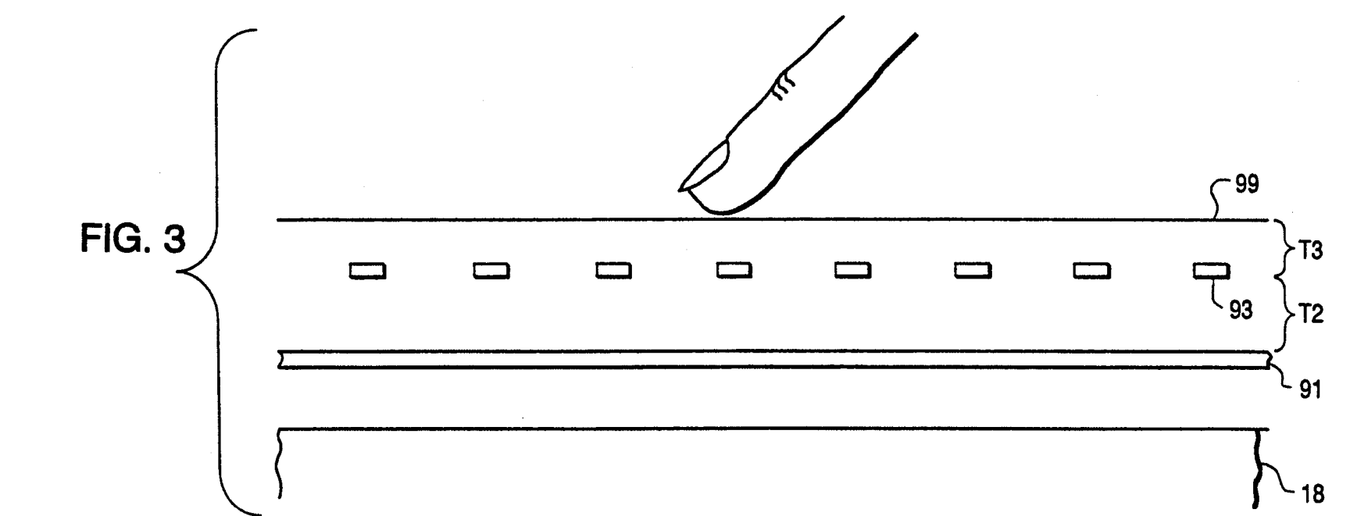
FIG. 3 is a representation of a generalized overlay structure depicting the upper and lower conductors, the top surface of the overlay and the viewing surface of the display.

Reference is made to FIG. 3 which shows a generalized overlay structure. The lower conductor set 91 is disposed over the viewing surface of the display. The upper conductors 93 are disposed over and oriented orthogonally to the lower conductors 91. The top surface 99 of the overlay is depicted with the user's finger disposed thereon. The separation between the finger and the upper conductors, T3, and the separation between the upper and lower conductors, T2 are also shown. In this figure, supporting structures such as substrates and adhesive layers are omitted.

The magnitude of capacitance changes when the overlay is touched must be a significant fraction of the ambient capacitances of the conductors directly beneath the finger contact area. The finger behaves like a capacitive electrode that returns to ground through the user's body. The capacitance change seen by the conductor is inversely proportional to the distance from the conductor to the contact area of the finger and directly proportional to the finger contact area. Greater finger contact area and smaller separation between finger and conductor result in larger capacitance change and provide greater safety margins to cope with random variations. The distance from the top surface of the overlay and the upper conductors, T3, should be as thin as possible. Thicknesses of 1 or 2 mils thick have been used effectively. A thickness of 3 mils can work, but the effect of finger is attenuated and it might be necessary to increase the number of cycles for reliable sensing. This would cause a corresponding increase in sensing time. Increase in T3 does not change ambient capacitance.

For the conductors in the upper layer, the distance to the finger is independent of separation between upper and lower (x and y) conductors. The separation between finger and upper layer conductors, T3, depends on the thickness of the materials between the outer surface of the overlay 99, and the conductors 93. The capacitance change due to finger touch is enhanced by making the separation as small as possible. It is readily apparent that by keeping the separation between the upper surface of the overlay and upper conductors, T3, small and increasing the separation between the upper and lower conductor layers, T2, reliable sensing of the finger touch for the upper conductors 93 is performed more rapidly. The routine which is used to determine finger touch must evaluate capacitance for all of the conductors. The increased separation between upper and lower conductor layer, T2, reduces the time required to perform the prescribed number of measurement cycles for all of the conductors, those that do not experience a finger touch as well as for the few conductors that are beneath the finger contact area. Therefore, the time required to make a full determination of finger touch location for the upper conductors is reduced substantially by increasing T2.

Increasing the separation between upper and lower conductor layers, T2, also increases the distance from a finger on the overlay surface 99, to the lower layer conductors 91 (T2+T3). Consequently, the capacitance change due to finger touch for the lower conductors 91, is decreased along with the ambient capacitance for those conductors. To assure reliable finger touch detection for the lower layer conductors 91, more measurement cycles are prescribed. Since the ambient capacitance is reduced, the time to perform each measurement cycle will be shortened. The change in the time required to perform a full finger touch determination for the lower conductors will depend on the relative magnitudes of the decrease in ambient capacitance and the required increase in the prescribed number of cycles to perform reliable touch determination.

The required number of cycles to perform reliable touch determination is increased enough to make the accumulated duration of repeated charging cycles essentially the same for conductors at different distances from the overlay surface. This condition can be shown by the equation:

$$n1 * t1 = n2 * t2$$

where n1 and t1 are the number of cycles and charge time for one set of conductors at one distance from the surface and n2 and t2 are the number of cycles and charge time for a second set of conductors at a different distance from the surface, respectively. The charge time for each cycle is inversely proportional to the distance between finger and conductor.

$$t1 = K * C1$$

where K is a constant equal to the firing threshold of the oscillator divided by the constant current delivered by the oscillator power supply. Consequently, $$n1 * K*C1 = n2 * K*C2$$

and $$\frac{n1}{n2} = \frac{C2}{C1}$$

Accordingly, the increase in number of repeat cycles must be proportional to the reduction in the capacitance change that occurs with finger touch.

For lower layer conductors 91, the percent reduction in capacitance change due to finger will not be proportional to increase in the separation between conductor layers, T2, because the separation between finger and conductor is equal to T2+T3. For example, for an overlay structure with 2 mil separation between surface and top conductor and 2 mil separation between the two conductor layers, increasing the separation between conductor layers to 4 mils will reduce the capacitance between layers by 50%. The capacitance between finger and the lower layer conductors will only be reduced 33%. Since the finger touch capacitance change will only be reduced by 33% for the lower conductors 91, the prescribed number of cycles should be increased according to the relationship:

$$\frac{n1}{n2} = \frac{C2}{C1} = 0.667$$

$$n2 = 1.5*n1$$

This condition requires a 50% increase in the number of repeat cycles for the lower layer conductors. The upper layer conductors do not require an increase in number of repeat cycles because the finger touch capacitance change is not reduced by increasing the separation between layers.

The time required to perform the measurement cycles depends on ambient capacitance. For this example, the ambient capacitance due to proximity of the x and y layers is reduced by 50% for both upper and lower layer conductors and the period for each measurement cycle is also reduced by 50%. Consequently, the time to perform the finger touch determination for the lower conductors with 1.5 times as many cycles will be ¾ as long. The relative time required to perform a complete finger touch position determination is estimated in Table I for several representative values of T2 and T3.

TABLE I

| T2 | T3 | m | t | Lower Layer Time m * t | Upper Layer Time t | Total Time (1 + m) * t |
|---|---|---|---|---|---|---|
| .002 | .002 | 1.000 | 0.500 | 0.500 | 0.500 | 1.000 |
| .004 | .002 | 1.500 | 0.250 | 0.375 | 0.250 | 0.625 |
| .006 | .002 | 2.000 | 0.167 | 0.333 | 0.167 | 0.500 |
| .008 | .002 | 2.500 | 0.125 | 0.316 | 0.125 | 0.441 |
| .002 | .001 | 0.750 | 0.500 | 0.375 | 0.375 | 0.750 |
| .004 | .001 | 1.250 | 0.250 | 0.313 | 0.188 | 0.501 |
| .006 | .001 | 1.750 | 0.167 | 0.293 | 0.125 | 0.418 |
| .008 | .001 | 2.250 | 0.125 | 0.281 | 0.094 | 0.375 |

The estimated time required to perform a location operation with values of T2 and T3 both equal to 0.002" is the reference for these comparisons. The parameter "m" compares the distance from the surface to the lower conductors for the configuration contained in Table I. For the reference configuration, the relative time for sensing both the lower and upper layers is given an arbitrary time value of 1.0 with half of the time attributed no each layer. As shown by these calculations, the time to perform location operations decreases when T2 is increased or when T3 is decreased. For these assumptions, the number of cycles for reliable touch sensing with the bottom conductors increases more slowly than the reduction in ambient capacitance as T2 becomes larger.

The preceding time estimates assume that inter-layer capacitance is the only component of ambient capacitance. If the drive bus, cables and other components contribute 30% of the ambient capacitance the relative times change differently as shown in Table II:

TABLE II

| T2 | T3 | m | t | Lower Layer Time L = m * t | Upper Layer Time U = t' | Total Time U + L |
|---|---|---|---|---|---|---|
| .002 | .002 | 1.000 | 0.500 | 0.500 | 0.500 | 1.000 |
| .004 | .002 | 1.500 | 0.325 | 0.488 | 0.325 | 0.813 |
| .006 | .002 | 2.000 | 0.267 | 0.534 | 0.267 | 0.801 |
| .008 | .002 | 2.500 | 0.238 | 0.595 | 0.238 | 0.833 |
| .002 | .001 | 0.750 | 0.500 | 0.375 | 0.375 | 0.750 |
| .004 | .001 | 1.250 | 0.325 | 0.406 | 0.244 | 0.650 |
| .006 | .001 | 1.750 | 0.267 | 0.467 | 0.200 | 0.667 |
| .008 | .001 | 2.250 | 0.238 | 0.534 | 0.178 | 0.712 |

The following relationships represent the conditions assumed for calculations in Table II.

$$m=(T2+T3)/0.004$$

$$t'=(0.3+(0.002/T2)*0.7)*t \quad (T2=0.200)$$

The data presented in Table II show optimum value for operating time T2 between 0.004" and 0.008" depending on the T3 thickness. This is in contrast with the data contained in Table I which showed a continuing improvement in the operating time through T2 values of 0.008".

The differences between Table I and Table II illustrate the importance of the capacitance to ground of the cable that attaches the overlay to the capacitance sensing electronics and the bus in the overlay that attaches the ITO conductors to the capacitance sensing electronics.

The values in these tables make it is possible to select a best design compromise between touch input rate and finger touch sensitivity. Maximum repetition rate is an important commercial factor for the overlay. These values, along with considerations about ease of handling materials in manufacture, durability and other factors, suggest best choice design for this size overlay could have T3 equal to 0.0015 and T2 equal to 0.006 inches. The final choice would be based on the standard PET films that are readily available.

Physical parameters of the overlay and cables are the major determinants of ambient oscillator frequency. By minimizing ambient capacitance of the overlay and cables the frequency, and the number of touches that can be sensed per second, are maximized. Cable capacitance is best reduced within practical limits by placing the electronics near the overlay and shortening the cable.

The attachment of ITO conductors to their respective bus wires is made through apertures in a dielectric film between the planes of the ITO wires and the bus conductors. In the U.S. Pat. No. 4,686,323, all of the ITO conductors are attached to an X-bus or a Y-bus as appropriate. Each bus was located on a single side of the overlay. Alternative configurations can be used to reduce the ambient capacitance due to the incremental capacitance between each ITO conductor and the bus conductors to which it is not connected. By dividing the X- and Y-bus wires into two groups and placing each group at opposite edges of the overlay, each ITO conductor only needs to extend into the group that contains the bus wire to which the ITO conductor will connect by half. A further improvement is obtained by controlling the length of each ITO conductor during ITO deposition so that it reaches no further than the individual bus wire to which it connects within the group of bus wires. Thus, the number of capacitive crossings between ITO conductors and the bus wires to which they do not connect can be reduced yet further.

Durability

Figure 4:
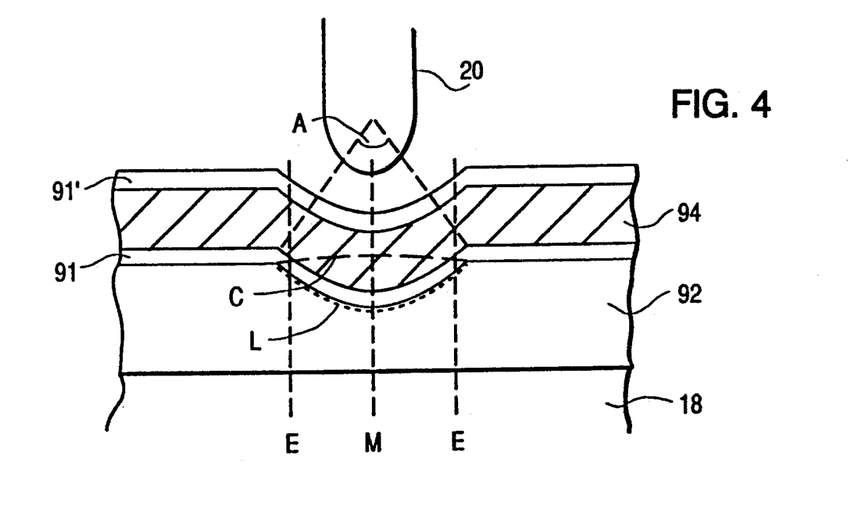
FIG. 4 depicts an exaggerated curvature of ITO conductors on the upper and lower surface of a substrate layer.

FIG. 4 is a greatly exaggerated representation of the deflection due to pressure of the stylus 20 of the ITO conductors 91 and 91' disposed on bottom and top of a flexible, insulating substrate layer 94 over an adhesive layer 92. The two conductors 91, 91' are portrayed as oriented in a parallel direction for ease of illustration. In a functional overlay, they would be oriented orthogonally with respect to each other as depicted in FIG. 3.

As shown in FIG. 4, ITO conductor 91' is an up facing conductor. Where sufficiently severe deformation of the ITO conductors to create microcracks is expected, the up orientation is preferred. This is particularly true for the upper conductors as a minimum amount of overlay material can be placed between the stylus 20 and the upper conductors and still maintain good finger touch sensitivity. Further, the method of preventing elongation of the ITO with a hard backing material is difficult in the upper conductors. At the midpoint of the depression, M, where the forces exerted by the stylus are greatest, creating the greatest potential for elongation, the conductor 91' on the top side of the substrate 94 is primarily under compressive forces to which ITO is much more immune. On the other hand, the bottom conductor 91 on the side of the substrate 94 is primarily under tensile forces at point M which leads to microcracks due to elongation in the ITO and overlay failure. Although the forces at the edges of the deflection, E, are reversed, tension for the conductor 91 and compression for the down conductor 91', these forces are much less than at midpoint.

Microcrack failure occurs when the film is stretched beyond the elastic limit of the ITO semiconductor. Existing data indicates these failures occur at about 1% extension of the film. The down orientation of the ITO conductor 91 can be tolerated if a means of preventing elongation equal or greater than one percent.

When the spherical tip of the stylus 20 is pressed into the overlay the down ITO conductor 91 is forced into a convex spherical surface which stretches out the area of contact. When local elongation exceeds one percent, microcracks begin to appear in the ITO. The elongation depends on the size and radius of the convex spherical area that is formed. Percent elongation is estimated by comparing the length of the arc created when the ITO film is stretched with the chord of that arc, the width of the region before stretching.

The arc length of the stretched film is proportional to both the radius of curvature of the convex region and the angle subtended by the arc.

$L = R * A$, where $A$ is the angle in radians

The chord of the arc is proportional to the radius of the curvature and the sine of half the angle subtended by the arc.

$C = 2R * \sin(A/2)$

The film stretch is the ratio of the arc length to the chord length.

$L/C = A/2 \sin(A/2)$

The film stretch is independent of the radius of curvature and only depends on the angle subtended by the stretched region.

Since experiments have shown the ITO can withstand elongation of 1% without cracking, the curvature limits for microcracks in the convex spherical area can be calculated from the expression:

$R * A' < = 1.01 * 2R * \sin(A'/2)$.

This condition is met when the angle $A' = 25$ degrees (0.4386 Radians). Cracks should not form if the subtended angle is 25 degrees or less.

Stylus tips of any radius should cause no microcracks when their penetration subtends less than 25 degrees. However, tips of different radii will have markedly different depths of penetration at 25 degrees. The following table shows depth of penetration at 25 degrees for several sphere radii of spherical deformation in the ITO layer. The ITO sphere radius is greater than stylus tip radius due to the thickness of the substrate 94 between the stylus tip and the ITO film. For the overlays of interest, this is about 0.005 inches. The following table shows values for the present tip radius, (0.048 = 0.043 + 0.005) inches and for radii ½ and ¼ as great. The smallest is about as sharp as a fine ball point. Table III shows values for the present tip radius:

TABLE III

| Radius of ITO Sphere (inches) | Sphere Sector (radians) | Arc Length (inches) | Chord Length (inches) | % Stretch | Penetration (inches) |
| --- | --- | --- | --- | --- | --- |
| 0.0480 | 0.43859 | 0.021052 | 0.020884 | 0.806048 | 0.001149 |
| 0.0260 | 0.43859 | 0.011403 | 0.011312 | 0.806048 | 0.000622 |
| 0.0155 | 0.43859 | 0.006798 | 0.006743 | 0.806048 | 0.000371 |

Thus, a small tipped stylus 20 has a much greater likelihood of creating microcracks given the same depth of penetration in the overlay. A stylus 20 formed of a softer material such as silicon rubber or having a larger diameter tip will tend to minimize the depth of penetration and hence the tensile force at midpoint for the down facing conductor 91. These calculations also suggest that microcrack formation will be inhibited if the ITO is supported on a surface that is hard enough to restrict the depth of penetration and the size of the convex spherical sector.

Experimental measurements tend to verify these analyses. Both face-up and face-down ITO showed great durability with a large radius stylus tip. No microcracks occurred in 10,000 rubbing cycles with 32 ounces of force using a 0.090 inch radius tip. This is several times greater than normal writing force. In tests with smaller radius tips, microcracks occurred after fewer rubbing cycles. The effects of other factors on durability could be examined by determining the cycles to produce failure with small radius tips and greater than normal force. Applied force, stylus tip radius, ITO facing up or down, material above the ITO layer, and the "softness" of the material beneath the ITO layer are factors that were studied.

A first test studied effects of smaller stylus tip radius. The overlay that showed no microcracks with 0.090 inch radius tip and 32 ounces of applied force, showed microcracks after fewer than 200 rubbing cycles with a 0.043 inch radius tip and 32 ounces of applied force. When the force was reduced to 16 ounces, this overlay showed no new microcracks after more than 38,000 rubbing cycles with the 0.043 inch radius tip.

Other tests examined overlay structure differences. One overlay had both the upper and lower layers of ITO facing up, away from the display. Another overlay had the upper layer of ITO facing up and the lower layer facing down. Both overlays were tested with a 0.043 inch radius tip and 32 ounces of applied force. The bottom layer that had ITO facing up showed microcrack failure after 28,000 rubbing cycles. The bottom layer that had ITO facing down showed microcrack failure after 1400 cycles. The tests on the overlay with bottom ITO layer facing down were performed at locations with different "softness" of the support beneath the overlay. An area that had softer support showed failure after 600 rubbing cycles. An area that had harder support failed after 9000 cycles.

A third set of tests were made with medium ball point pen with a stylus tip radius less than 0.015 inch and with 17.8 ounces of applied force. This choice of force and stylus tip radius was sufficiently stressful to assure that evidence of microcracking would occur in all tests after a reasonably small number of rubbing cycles.

Two overlay structures were tested. Overlay "A" had ITO conductors deposited on two separate substrates. It was fabricated with both ITO layers facing the same direction. Overlay "A" consisted of: a top cover of 0.0015" PET with Hard Coat Surface, a layer of 0.0005" Thermoplastic Adhesive, a first set of ITO conductors deposited on PET Substrate of 0.0015" in thickness, a layer of 0.0005" Thermoplastic Adhesive, a second set of ITO conductors deposited on PET Substrate of 0.005" in thickness.

Overlay durability tests were performed on "soft" and "hard" backing surfaces. The "hard" backing was an aluminum plate with a thin layer of pressure sensitive adhesive between overlay and plate. The "soft" backing was an acrylic plate. The overlay was attached to the "soft" backer with a 0.003" thick sandwich of adhesive, PET film, and adhesive.

Durability measurements were made on each overlay, with both backing surfaces and with the overlays positioned upright and upside down. The durability results are listed in the following table.

| ITO Facing | Backing | Orientation | Inches To Top | To Bottom | Rub Cycles |
|---|---|---|---|---|---|
| Up | Soft | Right Side Up | .0035 | .005 | 475 |
| Up | Soft | Right Side Up | .0020 | .0065 | 300 |
| Up | Hard | Right Side Up | .0035 | .005 | 1150 |
| Up | Hard | Right Side Up | .0020 | .0065 | 1700 |
| Down | Soft | Up Side Down | .005 | .0035 | 70 |
| Down | Soft | Up Side Down | .0065 | .002 | 90 |
| Down | Hard | Up Side Down | .005 | .0035 | 1120 |
| Down | Hard | Up Side Down | .0065 | .002 | 2600 |

The most apparent result for Overlay A is the increased durability with hard backing. ITO facing up is also consistently more durable than facing down, but the size of the improvement is not as great as the hard backing improvement. The effect of distance from the ITO layer to the top or bottom of the overlay is not as clear in these tests. However, a substantial improvement occurred for the bottom layer conductor when hard backing was used and the distance to the bottom was reduced.

Based on these results and the earlier analysis of ITO elongation in face down ITO layers, overlays with acceptable durability can be built with face down layers when a suitably hard backing surface is much thinner than the stylus tip radius.

An overlay structure that can be cemented directly to the glass surface of the display is preferred when the application permits. The adhesive layer should be very thin and of a suitably hard substance.

The glass plate of the display 18 can serve as a good hard backing for ITO if a suitably hard adhesive is used to attach the overlay with no intervening plastic film. If overlays can be fabricated without a bottom cover layer, it is easier to assure a hard backing for a lower, face-down ITO conductor layer.

The actual forces exerted on the down conductors 91 can vary according to materials used in the overlay. Where the adhesive layer 92 is soft relative to the substrate 94 and the stylus tip is hard, the tensile forces of the stylus are much more likely to crack the ITO conductors and cause overlay failure. Relatively hard adhesive layers such as the above mentioned thermal set polyester optical adhesives come in a variety of hardnesses which can be matched to the hardness of the polyester substrates to minimize the tensil forces and depth of penetration imparted to the ITO conductor 91 by the stylus 20. When the overlay is used primarily for finger touch operations, the cracking problem is not as great and may be acceptable for certain applications. In general, however, it is a less attractive feature of an overlay structure to have the upper conductors face down toward the display 18.

Overlay Structures

As mentioned above, there are four overlay structures according to the present invention. These structures account for the "up and away" or "down and toward" orientation of the upper and/or lower conductors. They are: a "face-up" structure, "face-down" structure, a "face-in" structure and a "face-out" structure. In the "face-up" structure, both conductor sets face up; in the "face-down" structure, both conductors sets face down. In the "face-in" structure, the conductor sets face toward each other; in the "face-out" structure, the conductor sets face away from each other. If the upper conductors face up, a protective top cover is added; if the lower conductors face down, a bottom cover may be added. The cover and substrate layers are glued together by adhesive layers to form a tight surface for stylus and finger sensing which reliably maintains the T2 and T3 thickness.

Reference to FIGS. 5, 6, 7 and 8 is made to explain the four possible configurations of the overlay according to the present invention. The four configurations are distinguished by the orientation of the ITO conductors. Actually, each ITO strip conductor has both upper and lower surfaces, the upper surface faces up, the lower surface faces down. The designations "up" and "down" refer to the ITO surface which is not deposited on the transparent substrate. Therefore, an ITO conductor is said to face up if its lower surface is deposited on the upper surface of a substrate, its upper surface free of a substrate, albeit embedded in adhesive, facing away from the display surface.

Figure 5:
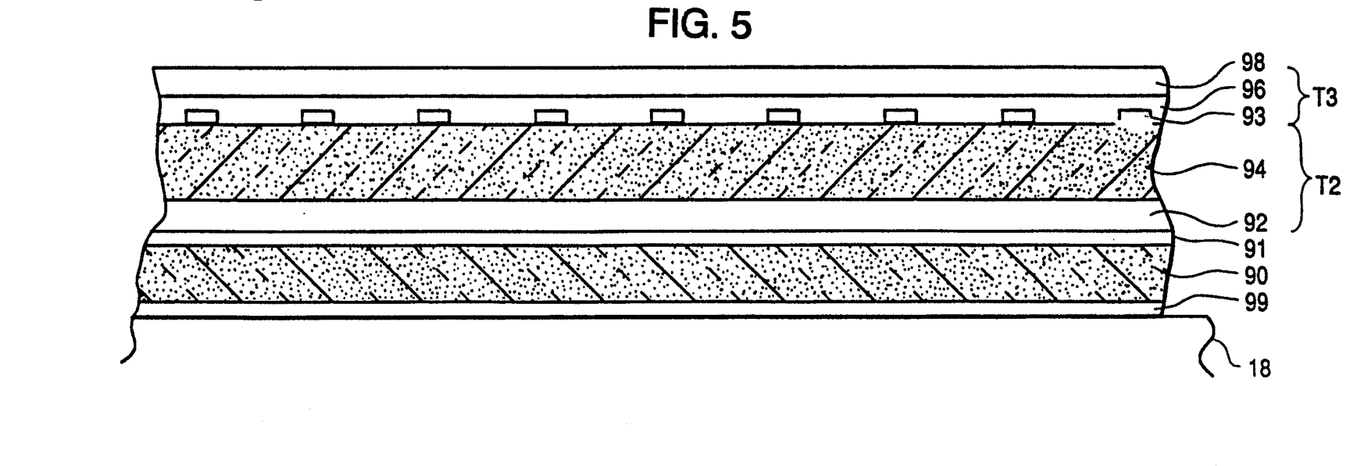
FIG. 5 is a cross sectional view representation of a face-up overlay structure suitable for finger touch and stylus position detection with both sets of conductors facing upward away from the display surface.

FIG. 5 shows a cross-sectional view of the "face-up" overlay 16 disposed on the viewing surface of a display device 18. In the early versions of the overlay, a CRT was used as the display device, rather than the LCD 18 of the preferred embodiment. The LCD 18 is preferred for many ergonomic reasons, including portability, weight, and an easily adjustable viewing angle. The LCD 18 is also a much less noisy environment for finger touch.

Lower substrate 90 is a sheet of transparent, insulating material disposed over the display device 18. While neither finger touch or stylus detection is affected by the thickness of the lower substrate 90, it should be kept relatively thin for transparency and reduced parallax. The lower, horizontal transparent conductors 91 are deposited on the lower substrate 90. A single conductor is shown for purposes of clarity. A thin layer of adhesive 92 bonds the lower conductors 91 and the lower substrate 90 to the upper substrate 94. The upper substrate 94 also a transparent insulating material similar in composition to lower substrate 90. Next, the vertical conductors 93, are deposited on the upper substrate 94. An adhesive layer 96 bonds the protective top cover 98 to the upper substrate 94 and upper conductors 93. The top cover 98 is also similar in composition to lower and upper substrates 90, 94. The entire overlay 16 is preferably attached to the LCD 18 by means of an adhesive layer 99 to provide a smooth, tight and well-supported surface for finger and touch detection.

In the face-up overlay, T2, the separation between the conductor planes 91 and 93 is the thicknesses of upper substrate 94 and the adhesive layer 92. The separation between the upper conductors 93 and a finger the top surface of the overlay, T3, is the thicknesses of the top cover 98 and the adhesive layer 96. A typical thickness of the adhesive layers is 0.5 mils. Referring to Tables I and II, the preferred separation, T2, is between 6 and 8 mils depending on the ambient capacitance of cables etc. Therefore, in a preferred embodiment, the thickness of the top cover 98 is 1 mil and that of the upper substrate 94 is 5.5 mils. In practice, the thicknesses of commercially available films are limited and a 5 mil substrate would be used.

As can be seen in FIG. 5, both lower conductors 91 and upper conductors 93 face up as they are deposited on the upper surface of lower substrate 90 and upper substrate 94 respectively. As discussed above, the advantage of an upward facing conductor has to do with the brittle nature of indium tin oxide (ITO) and ITO's relative resistance to compressive forces as opposed to tensile forces. As both conductor sets 91, 93 face up, the overlay 16 in FIG. 5 is not likely to suffer reliability problems from ITO cracking. Due to the greater thicknesses of the layers between the stylus 20 and the lower conductors 91, and the small separation that can be achieved between the lower layer and the hard glass backing of the display, it is less critical that the lower conductors face upward.

Figure 6:
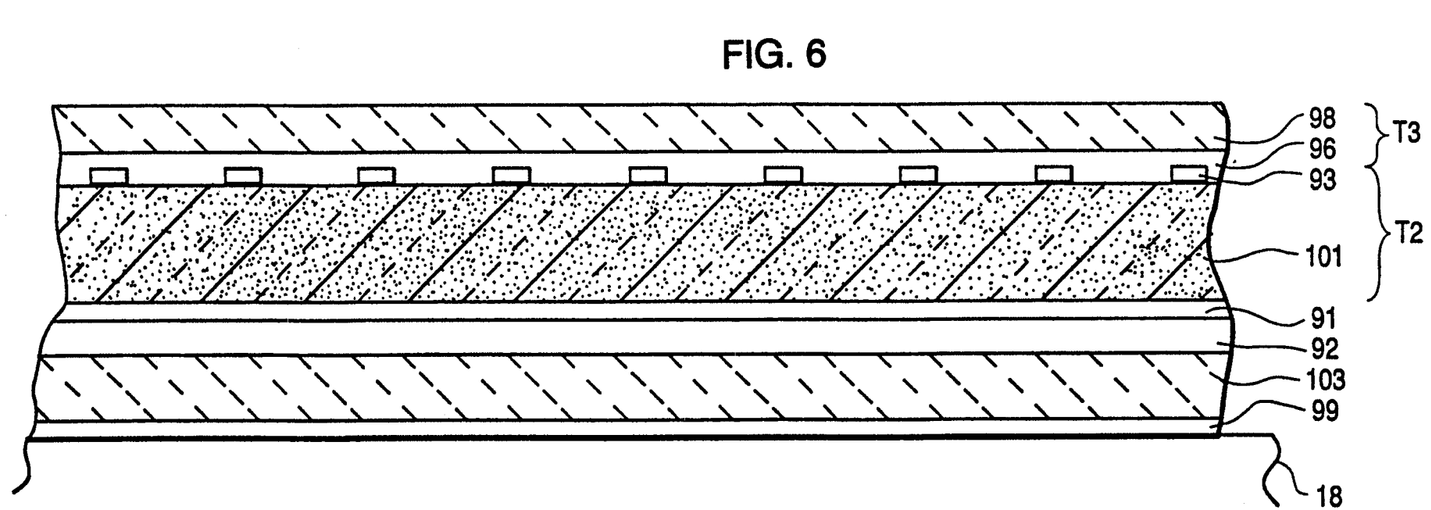
FIG. 6 is a cross sectional view representation of a face-out overlay structure where the conductors face out away from each other.
Figure 7:
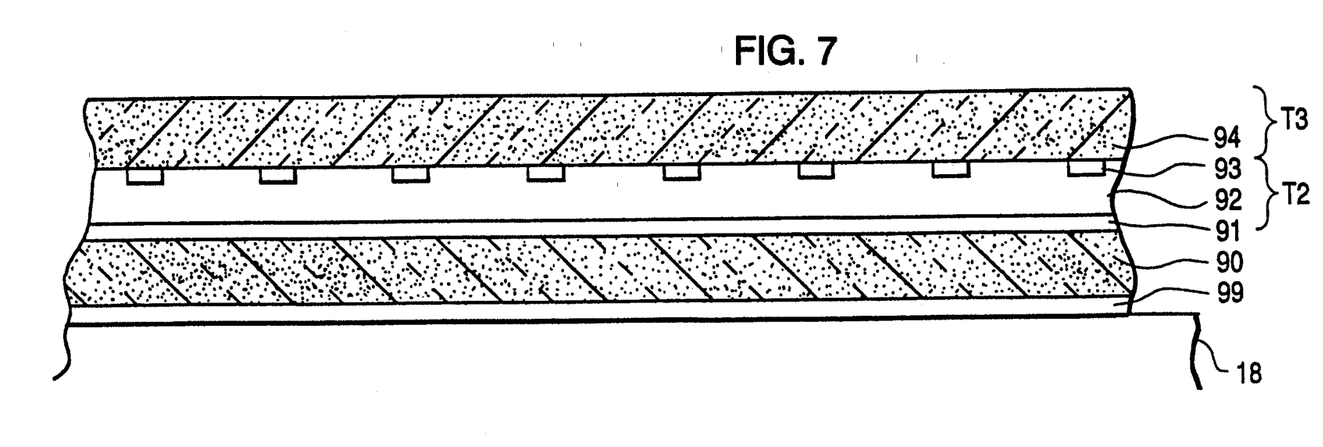
FIG. 7 is a cross sectional view representation of a face-in overlay structure suitable for finger touch and stylus position detection where the conductors face in, toward each other.
Figure 8:
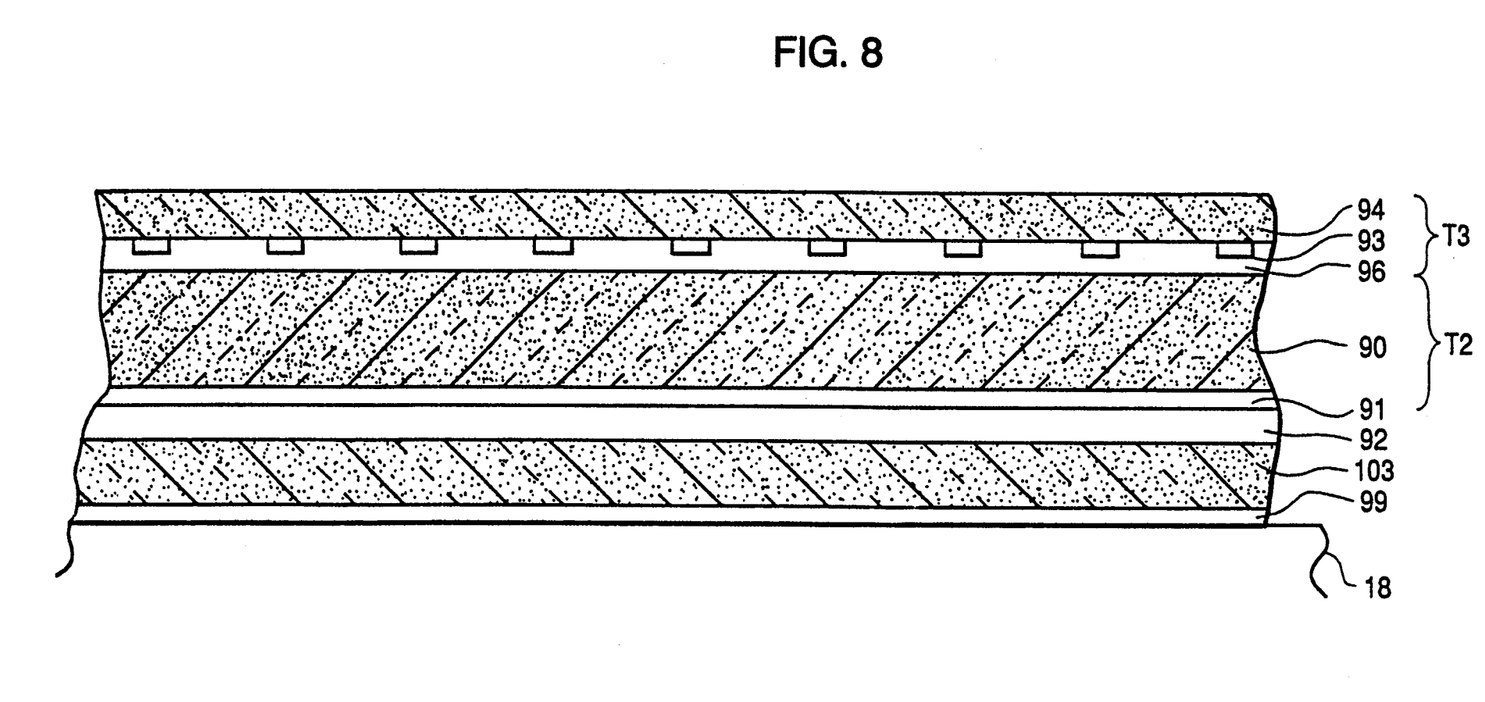
FIG. 8 is a cross sectional view representation of a face-down overlay structure where both sets of conductors face downward toward the display surface.

Several of the following comments regarding materials, supplementary layers and conductors spacing are equally applicable to the overlay structures depicted in FIGS. 6, 7, and 8. All components of the overlay are chosen for maximum optical transmissibility. As mentioned previously, the preferred transparent conductor material is ITO. None of the overlays depicted in FIG. 5, 6, 7 and 8 are drawn to scale. The indium tin oxide conductors 91, 93 are approximately 600 to 1600 Angstroms in thickness, much thinner than the substrate or adhesive layers. The exact thickness of the ITO depends on the desired sheet resistance of the overlay conductors. A preferred ITO thickness of 900 Angstroms yields a resistance of approximately 80 ohms per square inch. The substrate layers and top cover are preferably of biaxially oriented polyethylene terephthalate (PET), or polyester, formed in the desired thickness for the particular layer. A number of transparent adhesives can be used to attach the substrate together. A sheet form is preferred for manufacturing purposes. A variety of heat setting polyester adhesive layers are attractive because their hardness can be matched closely to the hardness substrate layers to minimize the forces exerted on the ITO conductors, particularly when a relatively hard adhesive is directly below a down facing ITO conductor layer. A pressure sensitive acrylic adhesive is more transparent than the polyester adhesive and can produce a more attractive, if somewhat less durable overlay.

An anti-glare top coat can be added to the top surface of the top cover 98 to prevent operator fatigue. The light reflecting properties of the top coat can be adjusted by the dimension of the particles which make up the surface. This granularity also serves to increase the friction between the stylus tip and overlay during writing to give a more paper-like feel to the user. The top coat can also protect the other layers of the overlay from abrasion and wear. A preferred material for the top coat is acrolyte, a UV cured, cross-linked polymer, which is very hard, as well as optically water clear. An electrostatic shield layer of less than 100 ohms per square may be added between the lower substrate 90 and the LCD 18 to reduce the effect of electrical noise that might be generated by the display 18. As the LCD 18 is much quieter electrically than the CRT disclosed in the '332 patent, the electrostatic shield layer can easily be omitted.

In FIG. 5, the overlay is attached to the glass LCD surface 18 by means of an adhesive 99. In an alternate embodiment, the overlay 16 would be attached to another piece of glass (not shown), or other transparent carrier plate of sufficient hardness, by an adhesive and then mounted to the LCD 18.

As discussed in the U.S. Pat. No. 4,686,332, the upper and lower conductors are approximately 0.025 inches wide and are spaced approximately 0.125 inches on a center-to-center spacing. An overlay for the touch workpad 10 depicted in FIG. 1 would measure about $14'' \times 14''$, therefore, there are 112 transparent, vertical conductors X1, X2, ... X112. The horizontal Y conductors Y1, Y2, . . . Y112 on the inner substrate 102 are oriented at right angles with respect to the vertical X conductors deposited on the outer substrate 104. Unlike some of the overlays discussed the prior art, electrical screening of the lower conductors by the upper conductors was never a concern with the sensing system as disclosed in the U.S. Pat. No. 4,686,332. This is true because the spacing of the conductors in the grid is fairly loose. Also, as the ITO conductors have relatively high resistance at 80 ohms/square and are driven at 40 kHz for the stylus sensing mode screening of the lower conductors does not occur. Resistivities of this magnitude or greater do not shield the stylus signal from the lower conductors to any significant extent, even when the separation between upper and lower conductors is as small as 2 mils.

As discussed in the U.S. Pat. No. 4,686,332, the overlay X and Y conductors are electrically connected to the other elements of the sensing system by means of several bus wire located at the periphery of the overlay. The requirement of a separate bus wire for each X and Y conductor would rapidly become unwieldily and increase the size, complexity and cost of the overlay. Therefore, several widely spaced conductors are connected to the same bus wire. In the preferred embodiment above in which there are 112 X conductors and 112 Y conductors, there are 16 X bus wires and 16 Y bus wires. Consequently, when a particular bus wire is energized, electromagnetic signals are generated by seven different conductors in the overlay.

FIG. 6 is a cross-sectional representation of a face-out overlay structure. In this structure, both lower conductors 91 and upper conductors 93 are deposited on a single substrate 101. As shown, the lower conductors 91 are oriented down and the upper conductors 93 are oriented up. Top cover 98 is attached by adhesive layer 96 to the upper surface of the substrate. A bottom cover 103 may be attached to the lower surface of the substrate 101 by adhesive layer 92, and attached to the LCD 18 by adhesive layer 99. In an alternative embodiment, the bottom cover layer can be dispensed with entirely and the face-out overlay glued directly to the LCD 18. Eliminating the bottom cover 103 would improve the transparency of the overlay 16 as there would be fewer layers for the LCD display 18 to shine through, as well as increasing the durability of the lower conductors 91.

Also shown is separation T2, the separation between the upper and lower conductors 91, 93 and separation T3, the separation between the top surface of the top cover 98 where the user's finger will touch and the upper conductors 93. In the face-out structure, T2 is the thickness of the substrate 101. Since the substrate thickness is more uniform than the combination of a substrate and adhesive layer, electrical field is more uniform with the face-out structure than the face-up, face-in or face-down structures which improves the accuracy of stylus sensing. T3 is the aggregate of the thickness of the top cover 98 and top adhesive layer 96.

While the lower conductors 91 face down and so are subject to elongating forces generated by the stylus, the lower conductors 91 in the face-out structure in FIG. 6 have improved resistance to cracking when compared to upper conductors 93 in the face-in structure in FIG. 7 or the face down overlay in FIG. 8 because the separation between the lower conductors 91 and the hard glass backing can be made very small and prevent elongation of the lower conductors 91.

FIG. 7 shows a cross-sectional view of the face-in overlay 16 positioned on the display surface of the LCD 18. The overlay 16 shown in FIG. 8 is similar to that shown in FIG. 12 of the U.S. Pat. No. 4,686,332 except that it uses the improved separations as taught by the present invention. The face-in overlay 16 consists of the lower substrate 90, a transparent, insulative layer upon which an array of lower transparent conductors 91 is deposited on its upper surface with a single wire 91 being shown in FIG. 7. An adhesive layer 92 covers the lower substrate 90 and horizontal conductors 91 and joins them to upper substrate 94. Upper vertical conductors 93 which are deposited on the lower surface of upper substrate 94, and therefore, face down toward the display.

As shown in FIG. 7, the upper conductors 93 face downward toward the display surface 18. When the stylus 20 comes down on the overlay 16, it exerts tensile forces stretching the upper conductors 93 at the point of contact. After repeated contacts, the vertical conductors tend to crack, thereby disrupting electrical conductivity and signal transmission in the overlay 16.

Also pictured in FIG. 7 are separations T2 and T3. The separation between the conductors 91 and 93, T2, is the thickness of the middle adhesive layer 92. In the face-in structure, the distance between the finger and the upper conductors T3, is the thickness of the upper substrate 94. T2 measurement of 6 mils according to the invention, may be somewhat large to achieve with adhesive layer alone. In this case, a laminate structure of two adhesive layers of 0.5 mils each on either side of a PET layer of 5 mils could be used. A disadvantage would be the increased number of interfaces for the LCD display 18 to shine through, thus reducing the transparency of the display. The upper substrate of the face in overlay should be on the order of 1.5 mils.

FIG. 8 is a cross-sectional representation of the final overlay structure, the face-down overlay. In the structure, both lower conductors 91 and the upper conductors 93 face down toward the LCD display 18. Lower conductors 91 are formed on the lower surface of lower substrate 90; upper conductors 93 are formed on the lower surface of upper substrate 94. Top adhesive layer 96 attaches the two substrates 90, 94 together. A bottom cover 103 may be attached to the lower surface of the lower substrate 90 via adhesive layer 92. Alternatively, the bottom cover can be eliminated and the substrate attached directly to the LCD 18 with a thin adhesive layer.

From a durability standpoint, the face-down overlay is less preferred as both the top and bottom conductor sets are primarily subject to elongation by the stylus. However, as compared to the face-up overlay, it has one less polyester layer and one less adhesive layer, and thus should have greater transparency. The lower conductors 91 are protected by the thickness of the substrate 90, 94 and adhesive layers 96 similar to those of the face-out overlay. Also, like the face-out overlay, the lower conductors 91 can be attached directly to the glass surface of the LCD 18, thus affording a very durable structure. Further, as discussed above, with the proper choice of adhesive and substrate materials in applications with moderate stylus use, the face-down structure will possess a sufficient durability.

Thus, for a wide range of overlay materials, the preferred embodiments of the overlay structure are the face-up or face-out structures as both sets of conductors have improved durability. Where the overlays will be used primarily for finger touch operations the face-down and face-in structures can be used. However, when the distances between conductors sets and the top surface of the overlay are optimized according to the invention, the downward facing upper conductors are susceptible to cracking. Other factors such as the hardness of the stylus tip, the diameter of the stylus tip, the hardness of the substrate layers versus the hardness of the adhesive used to join the substrates together and the resiliency of the display surface are important determinants of forces exerted on the conductors, and thus, the need to orient the conductors upward.

While the invention has been described with respect to several illustrative examples, it would be understood by those skilled in the art that modifications may be made without parting from the spirit and scope of the present invention. Although the discussions of substrate and adhesive layers have mentioned only a few suitable materials, the alternate materials having the properties of high transparency, closely matched index of refraction and flexibility have similar dielectric constraints so the calculations of Tables I and II should hold true. The embodiments presented above are for purposes of example only and are not to be taken to limit the scope of the appended claims.

We claim:

1. A touch overlay for a viewing surface of a display for detecting both finger touch or stylus location comprising:
   a set of transparent, lower conductors in a parallel arrangement on a surface of a lower flexible, transparent, insulating substrate;
   a set of transparent, upper conductors in a parallel arrangement on a surface of an upper flexible, transparent, insulating substrate, the upper conductors oriented orthogonally from the lower conductors and spaced at a distance greater than 3 mils to reduce the ambient capacitance of the overlay and increase speed of operation in finger touch mode;
   a protective top cover of a flexible, transparent, insulating material disposed over said upper substrate to protect the upper conductors during contact by a stylus, the top cover having a top surface for contact by a finger and a stylus; and
   at least one adhesive layer to bond the lower substrate and upper substrate together;
   wherein the separation between the top surface and the upper conductors is no more than 3 mils.

2. The touch overlay as recited in claim 1 which further comprises means to restrict elongation of the transparent upper and lower conductors when subjected to repeated pressure by a stylus.

3. The touch overlay as recited in claim 2, wherein the lower conductors are disposed on the lower substrate and the upper conductors are disposed on the upper substrate, and both conductors face up, away from the viewing surface of the display, being subjected to compression forces at the midpoint of a deflection caused by a stylus on the top surface.

4. The touch overlay as recited in claim 2, wherein the lower and upper substrates are a single substrate, the lower conductors face down, toward the display and the upper conductors face up, away from the display and both lower and upper conductors are disposed on the single substrate.

5. The touch overlay as recited in claim 4, which further comprises a bottom cover disposed under the lower conductors.

6. The touch overlay as recited in claim 4, which further comprises an adhesive layer to attach the overlay directly on the viewing surface of the display.

7. The touch overlay as recited in claim 1, wherein at least one adhesive layer is matched in hardness to the substrate and top cover layers to prevent elongation of the upper and lower conductors.

8. The touch overlay as recited in claim 1 which further comprises a split bus structure to which the lower and upper conductors are connected, a first fraction of the lower conductors connected to a bus located at a first edge of the overlay, a second fraction of the lower conductors which comprises the remainder of the lower conductors connected to a bus located at a second edge of the overlay opposite to the first side, a first fraction of the upper conductors connected to a bus located at a third edge of the overlay, a second fraction of the upper conductors which comprises the remainder of the upper conductors connected to a bus located at a fourth edge of the overlay opposite to the third side, the lower and upper conductors crossing only bus wires located in the bus to which they are connected, whereby the ambient capacitance of the overlay is reduced to speed operation in finger touch mode.

9. The touch overlay as recited in claim 8, wherein each of the upper and lower conductors extends only as far as necessary into the bus to which it is connected to connect to a bus wire in the bus, whereby the ambient capacitance of the overlay is reduced to speed operation in finger touch mode.

10. A touch overlay for a viewing surface of a display for detecting both finger touch or stylus location comprising:
    a flexible, transparent, insulating substrate having a lower and upper surface;
    a set of transparent, lower conductors in a parallel arrangement on the lower surface of the substrate;
    a set of transparent, upper conductors in a parallel arrangement on the upper surface of the substrate, the upper conductors oriented orthogonally from the lower conductors;
    a top cover of flexible, transparent, insulating material disposed over the upper conductors to protect the upper conductors during contact by a stylus, the top cover having a top surface for contact by a finger and a stylus; and,
    an adhesive layer to bond the substrate and top cover layers together;
    wherein the substrate has a thickness greater than 3 mils to reduce the ambient capacitance of the overlay and increase speed of operation in finger touch mode, and the aggregate thickness of the top cover and adhesive layer are no more than 3 mils.

11. The touch overlay as recited in claim 10, which further comprises a bottom cover disposed under the lower conductors.

12. The touch overlay as recited in claim 10, which further comprises an adhesive layer to attach the overlay directly on the viewing surface of the display.

13. The touch overlay as recited in claim 10, which further comprises a split bus structure to which the lower and upper conductors are connected, a first fraction of the lower conductors connected to a bus located at a first edge of the overlay, a second fraction of the lower conductors which comprises the remainder of the lower conductors connected to a bus located at a second edge of the overlay opposite to the first side, a first fraction of the upper conductors connected to a bus located at a third edge of the overlay, a second fraction of the upper conductors which comprises the remainder of the upper conductors connected to a bus located at a fourth edge of the overlay opposite to the third side, the lower and upper conductors crossing only bus wires located in the bus to which they are connected, whereby the ambient capacitance of the overlay is reduced to speed operation in finger touch mode.

14. The touch overlay as recited in claim 13, wherein each of the upper and lower conductors extends only as far as necessary into the bus to which it is connected to connect to a bus wire in the bus, whereby the ambient capacitance of the overlay is reduced to speed operation in finger touch mode.

15. An improved finger touch and stylus detection system for use at a viewing surface of a display comprising:
   a set of transparent, lower conductors in a parallel arrangement on a surface of a flexible, transparent, insulating lower substrate; a set of transparent, upper conductors in a parallel arrangement on a surface of a flexible, transparent, insulating upper substrate, the upper conductors oriented orthogonally from the lower conductors and spaced at a distance greater than 3 mils to reduce the ambient capacitance of the overlay and increase speed of operation in finger touch mode; a top cover of a flexible, transparent, insulating material disposed over the upper conductors to protect the upper conductors during contact by a stylus, the top cover having a top surface for contact by a finger or a stylus; and, at least one adhesive layer to bond the substrate and top cover layers together; wherein the separation between the top surface and the upper conductors is no more than 3 mils;
   a capacitive measurement means to detect finger input which runs more quickly when the ambient capacitance of the touch overlay is reduced;
   a radiative signal source for driving selected conductors of the touch overlay during stylus detection;
   a stylus for receiving signals produced by the conductors when driven by the radiative signal source;
   a radiative signal measurement means coupled to the stylus for measuring the received signals;
   a switchable path coupled to the upper and lower conductors, the capacitive measurement means, and the radiative signal source having a control input, for connecting selected conductors to the capacitive measurement means or radiative signal source for finger touch or stylus detection, respectively, in response to appropriate control signals being applied to the control input; and
   a control processor coupled to the capacitive measurement means, the radiative signal measurement means and the switchable path, for receiving measured capacitance values for finger touch detection, for receiving measured radiative signal values for stylus detection, and for producing the control signals to the control input of the switchable path.

16. The touch system as recited in claim 15, wherein the overlay further comprises means to restrict elongation of the transparent upper and lower conductors when subjected to repeated pressure by a stylus.

17. The touch system as recited in claim 15, wherein the capacitive measurement means comprises a variable frequency oscillator circuit.

18. The touch system as recited in claim 16, wherein the lower conductors are disposed on the lower substrate and the upper conductors are disposed on the upper substrate, and both conductors face up, away from the viewing surface of the display, being subjected to compression forces at the midpoint of a deflection caused by a stylus on the top surface.

19. The touch system as recited in claim 16, wherein the lower conductors face down, toward the display and the upper conductors face up, away from the display and both lower and upper conductors are disposed on the same substrate.

20. The touch system as recited in claim 19, wherein the overlay further comprises a bottom cover disposed under the lower conductors.

21. The touch system as recited in claim 19, wherein the overlay further comprises an adhesive layer to attach the overlay directly on the viewing surface of the display.

22. The touch system as recited in claim 15, wherein at least one adhesive layer is matched in hardness to the substrate and top cover layers to prevent elongation of the upper and lower conductors.

23. The touch system as recited in claim 15, wherein the overlay comprises a split bus structure to which the lower and upper conductors are connected, a first fraction of the lower conductors connected to a bus located at a first edge of the overlay, a second fraction of the lower conductors which comprises the remainder of the lower conductors connected to a bus located at a second edge of the overlay opposite to the first side, a first fraction of the upper conductors connected to a bus located at a third edge of the overlay, a second fraction of the upper conductors which comprises the remainder of the upper conductors connected to a bus located at a fourth edge of the overlay opposite to the third side, the lower and upper conductors crossing only bus wires located in the bus to which they are connected, whereby the ambient capacitance of the overlay is reduced to speed operation in finger touch mode.

24. The touch system as recited in claim 23, wherein each of the upper and lower conductors extends only as far as necessary into the bus to which it is connected to connect to a bus wire in the bus, whereby the ambient capacitance of the overlay is reduced to speed operation in finger touch mode.

25. The touch system recited in claim 15, wherein the capacitive measurement means includes a variable frequency oscillator and means for counting the pulses of the oscillator as a measurement of capacitance for the lower and upper conductors.

26. The touch system of claim 25 including means for increasing the number of pulses counted for the lower conductor when the the lower and upper conductors are at different distances from the top cover.

27. The touch system of claim 26 wherein the number of pulses counted for the lower conductor is given by the relationship $N(2)=1.5N(1)$ where $N(2)$ is the number of pulses counted for the lower conductor and $N(1)$ is the number of pulses counted for the upper conductor by the capacitance measuring means.

28. A touch overlay for a viewing surface of a display for detecting both finger touch or stylus location comprising:
   a set of transparent, lower conductors which face down in a parallel arrangement on a surface of a lower flexible, transparent, insulating substrate;
   a set of transparent, upper conductors which face down in a parallel arrangement on a surface of an upper flexible, transparent, insulating substrate, the upper conductors oriented orthogonally from the lower conductors and spaced at a distance greater than 3 mils to reduce the ambient capacitance of the overlay and increase speed of operation in finger touch mode;

a top cover of a flexible, transparent, insulating material disposed over said upper substrate to protect the upper conductors during contact by a stylus, the top cover having a top surface for contact by a finger and a stylus; and at least one adhesive layer to bond the lower substrate and upper substrate together.

* * * * *